United States Patent [19]

Grabher

[11] Patent Number: 5,439,334

[45] Date of Patent: Aug. 8, 1995

[54] QUICK CHANGE GEAR BOX FOR HARDWARE DRILLING MACHINE

[75] Inventor: Gënther Grabher, Fussbach, Austria

[73] Assignee: Grass AG, Hochst/Vlbg., Austria

[21] Appl. No.: 266,946

[22] Filed: Jun. 27, 1994

[30] Foreign Application Priority Data

Jun. 28, 1993 [DE] Germany ............... 9309483 U

[51] Int. Cl.$^6$ ............... B23Q 5/00; B23B 47/02
[52] U.S. Cl. ............... 409/230; 408/124
[58] Field of Search ............... 408/124, 241 R; 409/230, 231

[56] References Cited

U.S. PATENT DOCUMENTS

| | | | |
|---|---|---|---|
| 3,757,637 | 9/1973 | Eich et al. | 409/230 |
| 3,794,436 | 2/1974 | Rowlett | 408/124 |
| 4,305,189 | 12/1981 | Miyakawa | 409/230 |
| 4,614,468 | 9/1986 | Waldrich et al. | 409/230 |
| 4,650,376 | 3/1987 | Miyakawa | 408/124 |
| 4,770,575 | 9/1988 | Kolblin et al. | 409/230 |

FOREIGN PATENT DOCUMENTS 1366322 1/1988 U.S.S.R. ............... 409/230

Primary Examiner—Daniel W. Howell

[57] ABSTRACT

A quick change gear box for a hardware drilling machine includes a mounting plate having a catch pin bore hole and coupling bolt recesses provided with a coupling bolt bore hole and a coupling bolt slot having an upper surface. A fastening plate is provided with a spring biased catch pin insertable in the catch pin bore hole and spring biased headed coupling bolts receivable through the coupling bolt bore holes into the coupling bolt recesses. The coupling bolts are moveable in the coupling bolt recesses between an uncoupled position and a coupled with the coupling bolt heads urging a clamping force toward the fastening block on the coupling bolt slot upper surface. The coupling bolt slot upper surface ascends from one end of the coupling bolt recess to its other end, and the clamping force is increased by movement of the coupling bolt in the recess from the uncoupled position to the coupled position.

3 Claims, 2 Drawing Sheets

1

QUICK CHANGE GEAR BOX FOR HARDWARE DRILLING MACHINE

BACKGROUND OF THE INVENTION

1. Field of the Invention

The invention concerns a quick change gear box for a hardware drilling machine according to the features for claim 1.

2. Description of the Prior Art

Hardware drilling machines have a wide range of uses in the cabinet/furniture industry. They are used not only as drilling machines to produce the dowel holes in drawers, cabinet components and similar items, but also as milling and boring machines to produce the recesses to install hinges or other hardware.

A primary goal in small batch productions is to utilize a hardware drilling machine for various purposes. Therefore, the hardware drilling machine must have the smallest possible setup time and must be adaptable for a wide range of different working tasks.

In the DE-GM 89 05 347.8 a hardware drilling machine is submitted which has a holding plate with a flange-mounted motor which is vertically movable on a column. A rotary disk is placed under the holding plate which has gears with various working tools on its circumference. According to the requirements of the operations to be carried out, the corresponding tools with the rotary disk shall swing horizontally and engage with the motor's input gear. Consequently, all required tools for the required operating cycles are provided on the rotary disk and shall be turned into place, to be operated, one after the other, as needed.

In order to make a row of bore holes and recesses in wood- or plastic material components simultaneously, it is also known, to equip the rotary disk with various operation stops, which will be turned into operation by means of a single motor. With a single operating cycle, a multiple number of bore holes can be made in preselected distances between notches; whereby, an efficient and fast speed of operation is achieved.

Frequently though, there are only minor modifications to be made with the operation stops in order to adapt another cabinet carcass production in a cabinet shop or with a small batch production series. To be more cost effective it is therefore, desirable to adapt an existing operation stop to the modified requirements with as little handling as possible.

The purpose of the innovation is to further develop a hardware drilling machine so that a quick reset to another bore pattern is possible.

SUMMARY OF THE INVENTION

A fundamental feature of the innovation is that a quick change gear box shall be fastened on the hardware drilling machine; whereby, the quick change gear box shall be coupled with the motor shaft of the hardware drilling machine, and at the same time is mechanically fastened and held on the machine frame stand. The quick change gear box consists fundamentally of a coupling for the coupling with the motor shaft of the hardware drilling machine and a fastening block which is fastened with the quick change gear box on the hardware drilling machine. Furthermore, there are two coupling bolts included in the fastening block of the change gear box, which are held respectively by a spring in the fastening block, and a catch pin, which is held by a spring which presses outwardly.

A mounted plate is provided for the extension of the motor shaft on the machine frame stand of the hardware drilling machine. The two elongated slots which are located on the outer edges lying opposite from one another, concentric and off-center to the drive shaft shall take up the coupling bolts. The elongated slots are shaped so that the coupling bolts can be inserted or pulled out of the elongated slots when the quick change gear box is in a disengaged or "uncoupled" state. The elongated slot consists of this bore hole which corresponds to the diameter of the bolt head, a slot which corresponds to the diameter of the bolt shaft, and an elongated slot groove on the top of the slot, whose width corresponds to the diameter of the bolt head, and this takes up the bolt head in the engaged or "coupled" state and, thus, holds the coupling bolts and, consequently, the entire quick change gear box. The coupling bolts can, therefore, no longer be pulled out of the mounting plate.

In order to securely fix the fastening block on the mounting plate, the elongated slot groove has an incline which begins rising at the bore hole for the insertion to the "pulling out" of the coupling bolts. The bolt heads run up this incline when the fastening block is screwed-in. Therefore it is possible to insert the coupling bolts without counterpressure and the mounting pressure will only be achieved by turning, i.e. by coupling. The resulting holding pressure of the fastening block to the mounting plate is achieved in that the coupling bolts shall be pulled against a spring which holds the coupling bolts in the fastening block.

The catch pin, at its insertion of the quick change gear box, is pressed against the mounting plate and catches (when the connection is finished and the bolt heads are in the end position in the elongated slot grooves)in a bore hole in the mounting plate and secures the achieved position against turning, that is, the quick change gear box shall be held in this position. To release the quick change gear box, the catch pin must be pulled back out of the bore hole against its spring.

In order to achieve a secure insertion of the quick change gear box to the coupling with the motor shaft of the hardware drilling machine, the fastening block is advantageously provided with a centering member.

The innovation makes it possible to place the fastening block to the mounting plate of the hardware drilling machine with very little handling and manipulation; whereby, the centering member of the fastening block engages on the motor shaft and the coupling bolts are inserted in the elongated slots of the mounting plate, and slightly turned; whereby, the coupling bolts are tight and the mounting plate is secured.

The fastening block of the quick change gear has a shape which adapts to the respective hole pattern of the hardware drilling machine. Since only a few elements are required which can be connected to each other in a small space, this quick change gear box can also be placed in small machines and devices. The advantage is the very little setup time, that is, change time, that is required for the gear box. Therefore, a special operations stop must not be available for every hole pattern, especially with small batch production.

BRIEF DESCRIPTION OF THE DRAWINGS

The innovation at hand shall be more closely explained in the following.

Indicated.

DESCRIPTION OF THE PREFERRED EMBODIMENT

Figure 1:
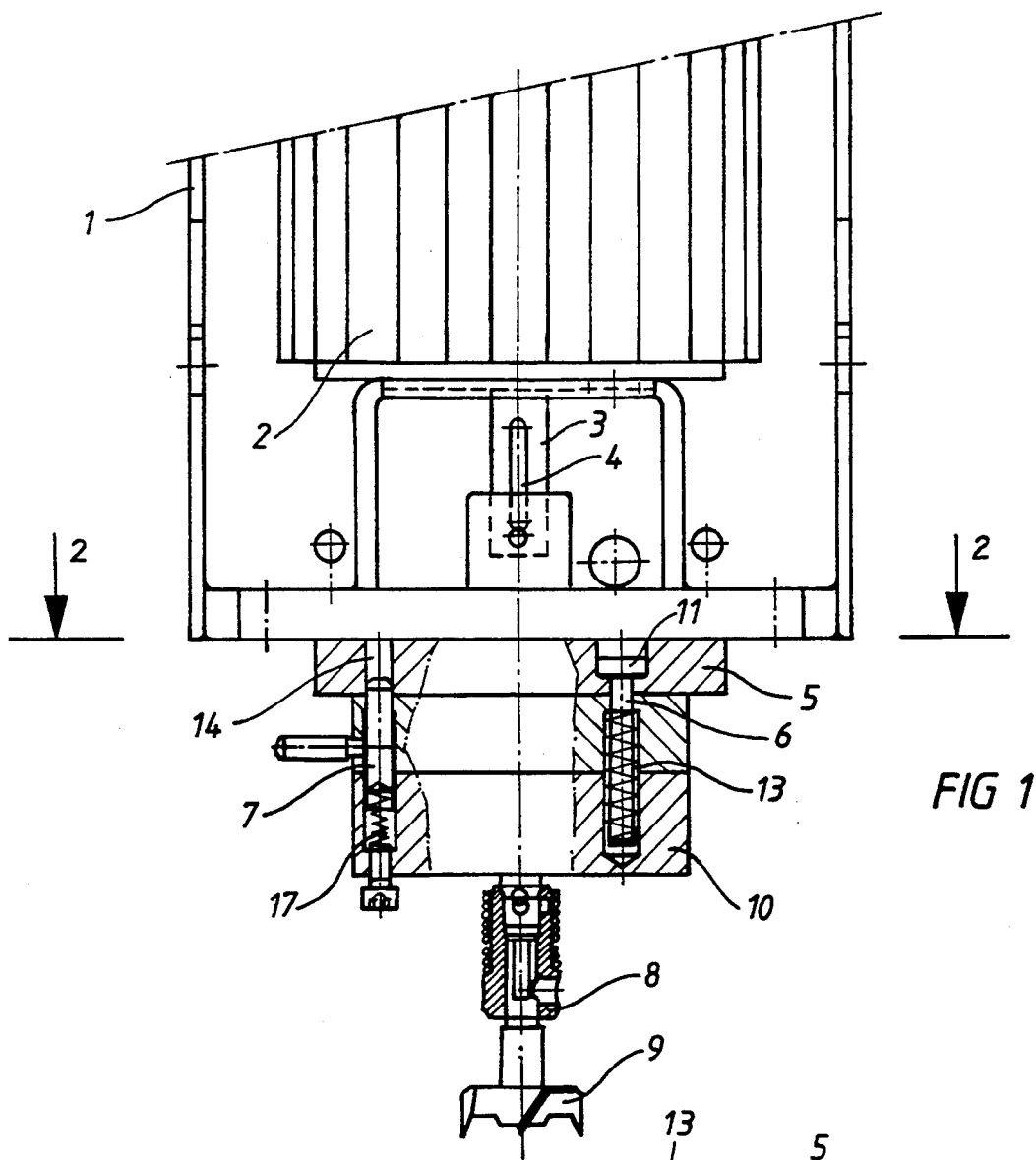
FIG. 1: one of a hardware drilling machine coupled to quick change gear box.
Figure 2:
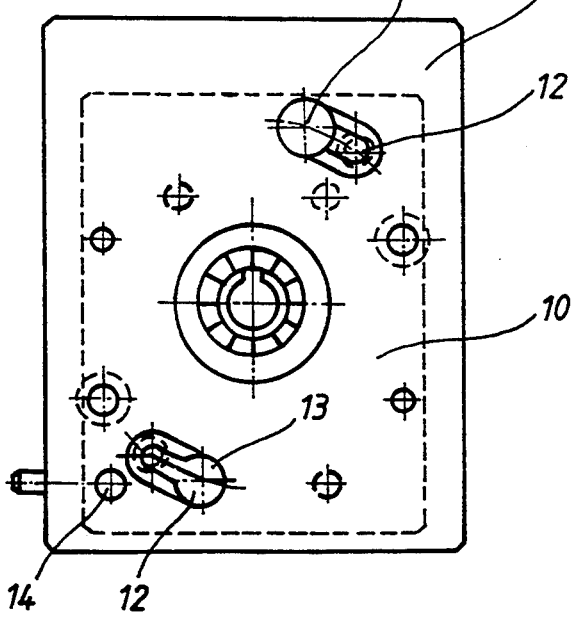
FIG. 2: a top view along the section 2—2 in FIG. 1.

The reference figures denote the same elements in the individual drawings. In the FIG. 1, a machine frame stand (1) of a hardware drilling machine with a motor (2) is represented, on which a motor shaft (3) has a groove connection (4). On the machine frame stand (1), a mounting plate (5) is provided in the extension of the motor shaft (3). Two concentric elongated slots (12) are provided to take up the coupling bolts (6) in order to fasten the quick change gear box. On the end of the elongated slot which corresponds to the disengaged "uncoupled" state, a bore hole (13) has a large diameter for the bolt heads (11) of the coupling bolts (6) and, on the other end, which corresponds to the engaged "coupled" state, there is a small diameter for the bold body of the coupling bolts (6) which is illustrated in the sectional view along the Line 2—2 in FIG. 2. Moreover, a bore hole (14) is located in the fastening block for the catch pin (7), which with the help of a spring (17) catches in the bore hole (14). This serves as a position transmitter and secures against the turning of the quick change gear box in relation to the mounting plate (5). In the illustrated state in FIG. 1, the tool (9), in this case a milling cutter tool, is connected over a coupling (8) with the motor shaft (3)

Figure 3:
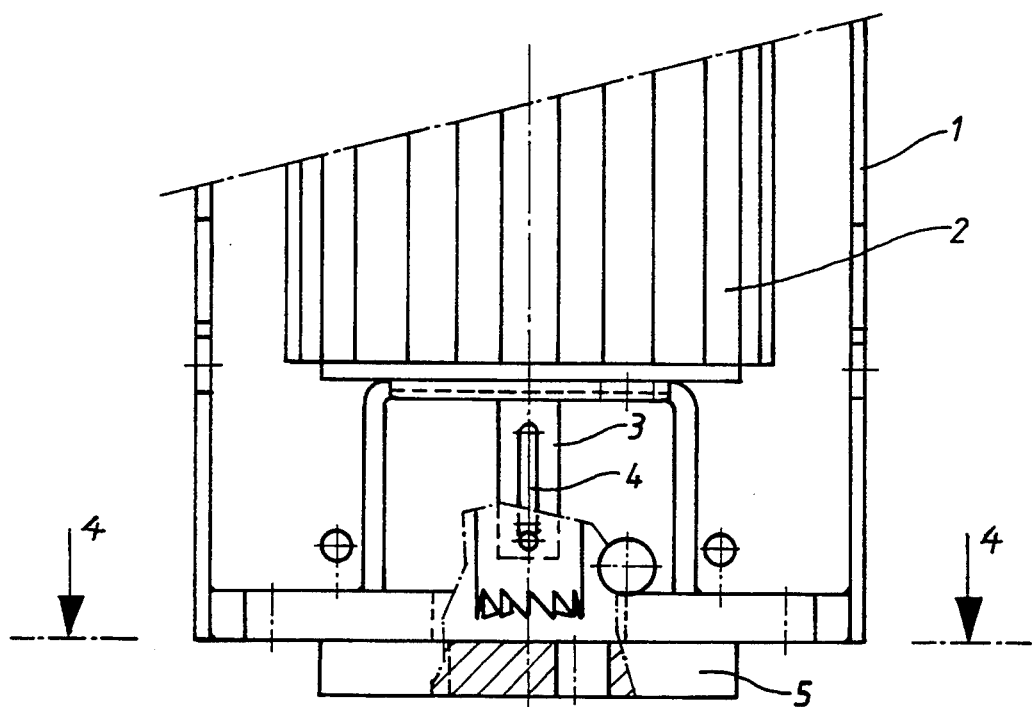
FIG. 3: an explosion drawing of the hardware drilling machine and the quick change gear box.
Figure 4:
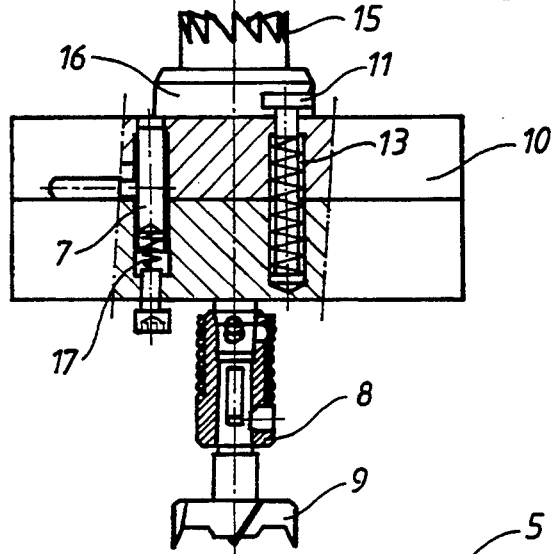
FIG. 4: a top view along the section 4—4 in FIG. 3.
Figure 4:
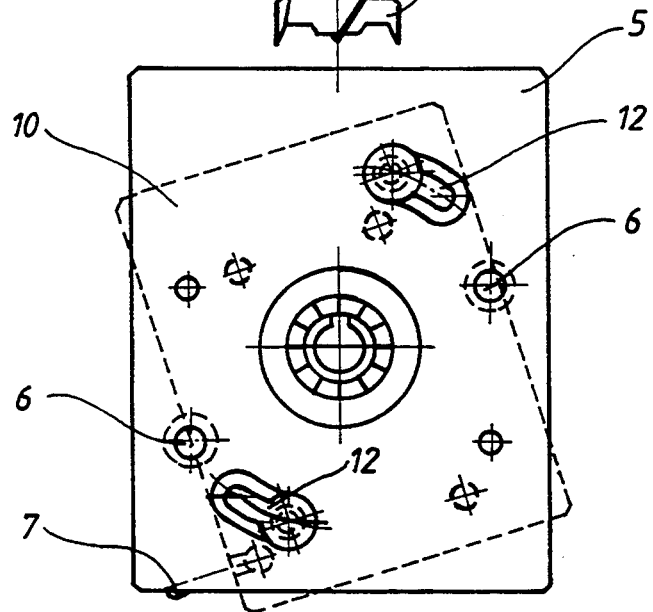

FIG. 3 shows an exploded view of the quick change gear box and the hardware drilling machine with a saw tooth coupling (15) and a centering member (16). In FIG. 4, in which the sectional view along the Line 4—4 of FIG. 3 is shown, the fastening block (10) of the quick change gear box is turned in relation to the mounting plate (5). The bolt heads (11) of the coupling bolts (6) are now in a position in which they can be guided and inserted into the elongated slots (12) of the mounting plate (5). There, the concentric elongated slots (12) in the mounting plate (5) have, in this position, a bore hole (13) whose diameter corresponds to the bolt heads (11). The coupling bolts (6), thus, fully insert the bore holes (12) in order to fasten the quick change gear box to the hardware drilling machine, and then are pressed by a right turn of the fastening block (10) in the concentric slots (12). The diameter, of the elongated slots (12) in this position, correspond to the diameter of the body of the coupling bolts (6) so that the bolt heads (11) lie on the elongated slot groove. In order to increase the retaining pressure of the quick change gear box on the mounting plate (5), the elongated slot grooves have an incline for the bolt heads (11). Thereby, the coupling bolts (6) are pulled against the force of the springs (13) in the mounting plate (5). Thus, the catch pin (7) slides along the mounting plate (5) and is pressed in the engaged "coupled" position of FIG. 1 in the bore hole (14) by means of the spring (17). In this position the quick change gear box is engaged and secured against turning.

In order to release the gear box, the catch pin (7) shall be pressed downwardly against the spring (17) and at the same time, the fastening block (10) shall be turned in a clock-wise direction. When it stops, the bolt heads (11) are then located in the bore holes (13) of the elongated slots (12)—the diameter corresponding to the bolt heads (11)—and the quick change gear

What is claimed is:

1. Quick change gear box for a hardware drilling machine of the type having a machine frame stand supporting a motor with a rotatable shaft which is connectable to a vertical boring tool, the quick change gear box comprising:

a mounting plate attachable to said machine frame stand and having portions defining at least two elongate coupling bolt recesses and at least one catch pin bore hole, each recess having a coupling bolt bore hole at a first end of the recess and a coupling bolt slot leading from the coupling bolt bore hole to a second end of the recess, and each coupling bolt slot having an upper surface; and a fastening block for supporting said boring tool having at least two spring biased headed coupling bolts receivable through respective ones of said coupling bolt bore holes into said first recess end in an uncoupled position of the coupling bolt and moveable in the recess to said second recess end in a coupled position of the coupling bolt with the coupling bolt head urging a clamping force toward the fastening block on said coupling bolt slot upper surface, the coupling bolt slot including means increasing said clamping force on movement of the coupling bolt from the first recess end toward the second recess end, and the fastening block having a spring biased catch pin inserting said catch pin bore hole.

2. The quick change gear box as claimed in claim 1, said clamping force increasing means comprising an incline in said coupling bolt slot upper surface ascending from said first coupling bolt recess end to said second coupling bolt recess end.

3. The quick change gear box as claimed in claim 2, wherein said fastening block is provided with a centering member for positioning the fastening block relative to said mounting plate.

* * * * *